US012675883B2

(12) United States Patent
Peters et al.

(10) Patent No.: US 12,675,883 B2
(45) Date of Patent: Jul. 7, 2026

(54) FAILURE DETECTION FOR SEGMENTATION OF AN IMAGE

(71) Applicant: KONINKLIJKE PHILIPS N.V., Eindhoven (NL)

(72) Inventors: Jochen Peters, Norderstedt (DE); Matthias Lenga, Mainz (DE); Tobias Wissel, Lübeck (DE); Irina Waechter-Stehle, Hamburg (DE); Frank Michael Weber, Norderstedt (DE); Arne Ewald, Hamburg (DE); André Goossen, Eldena (DE); Sebastian Wild, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 296 days.

(21) Appl. No.: 17/918,172

(22) PCT Filed: Apr. 12, 2021

(86) PCT No.: PCT/EP2021/059402
§ 371 (c)(1),
(2) Date: Oct. 11, 2022

(87) PCT Pub. No.: WO2021/209367
PCT Pub. Date: Oct. 21, 2021

(65) Prior Publication Data
US 2023/0126342 A1 Apr. 27, 2023

(30) Foreign Application Priority Data
Apr. 16, 2020 (EP) ..................................... 20169748

(51) Int. Cl.
*G06T 7/12* (2017.01)
*G06T 17/20* (2006.01)
(Continued)

(52) U.S. Cl.
CPC ................ *G06T 7/12* (2017.01); *G06T 17/20* (2013.01); *G06V 10/761* (2022.01); *G06V 10/764* (2022.01); *G06T 2207/30048* (2013.01)

(58) Field of Classification Search
CPC . G06T 7/12; G06T 17/20; G06T 2207/30048; G06T 2207/10072;
(Continued)

(56) References Cited

U.S. PATENT DOCUMENTS 11,232,577 B2 * 1/2022 Zilberstien ................ G06T 7/13
11,259,874 B1 * 3/2022 Landon .................. G16H 40/67
(Continued)

FOREIGN PATENT DOCUMENTS

WO 03005298 A2 1/2003
WO 2013040673 A1 3/2013
(Continued)

OTHER PUBLICATIONS

IBM, Www.ibm.com, What Is a Machine Learning Algorithm? [ 2024] Retrieved from the internet—www.ibm.com/topics/machine-learning-algorithms. (Year: 2024).*
(Continued)

*Primary Examiner* — Chan S Park

(57) ABSTRACT

A mechanism for determining a score indicative of a success of a segmentation of a 3D image, i.e. a success score. The mechanism proposes to obtain one or more 2D images of different target views of a target object in the 3D image, by processing a segmentation result of the 3D image. (A view of) each 2D image is classified using an automated classifier. The classification results are used to determine a success score, which may indicate, for example, whether, or how closely, the 3D segmentation result represents a ground truth segmentation result with sufficient accuracy, e.g. for clinical decision making.

15 Claims, 3 Drawing Sheets

(51) Int. Cl.
  *G06V 10/74* (2022.01)
  *G06V 10/764* (2022.01)
(58) Field of Classification Search
  CPC .......... G06T 2207/10132; G06T 2207/20084;
  G06V 10/761; G06V 10/764
  See application file for complete search history.

(56) References Cited

U.S. PATENT DOCUMENTS

| | | | | |
|---|---|---|---|---|
| 11,918,333 | B2 * | 3/2024 | Grouchy | G06T 11/006 |
| 11,950,961 | B2 * | 4/2024 | Deo | A61B 8/5223 |
| 11,983,473 | B2 * | 5/2024 | Aben | G06F 30/20 |
| 2013/0050208 | A1 | 2/2013 | Lin et al. | |
| 2016/0038121 | A1 | 2/2016 | Waechter-Stehle et al. | |
| 2017/0263023 | A1 | 9/2017 | Zhou et al. | |
| 2019/0171897 | A1 * | 6/2019 | Merai | G06N 5/048 |
| 2022/0230320 | A1 * | 7/2022 | Siemionow | G06T 7/10 |
| 2023/0298203 | A1 * | 9/2023 | Besbes | G06T 7/75 |
| | | | | 382/103 |

FOREIGN PATENT DOCUMENTS

| | | | |
|---|---|---|---|
| WO | 2018015414 | A1 | 1/2018 |
| WO | 2020020809 | A1 | 1/2020 |

OTHER PUBLICATIONS

International Search Report and Written Opinion for PCT/EP2021/059402; Mailing date: May 7, 2021, 11 pages.

Kim, J. et al., "A quantitative evaluation measure for 3D biomedical image segmentation", IFAC Proceedings Volumes, 2003, vol. 36, Issue 15, pp. 169-173.

Landesberger, T.v., "Comparative Local Quality Assessment of 3D Medical Image Segmentations with Focus on Statistical Shape Model-Based Algorithms,", IEEE Transactions on Visualization and Computer Graphics, 2016, vol. 22, No. 12, pp. 2537-2549.

Benhabiles, H. et al., "A comparative study of existing metrics for 3D-mesh segmentation evaluation", Visual Computer, 2010, vol. 26, pp. 1451-1466.

Paglieroni, D.W. et al., "Design considerations for image segmentation quality assessment measures", Pattern Recognition, 2004, vol. 37, Issue 8, pp. 1607-1617.

Prassni, J-S. et al., "Uncertainty-Aware Guided vol. Segmentation", IEEE Transactions on Visualization and Computer Graphics, 2010, vol. 16, No. 6, pp. 1358-1365.

Ecabert, O. et al., "Automatic Model-Based Segmentation of the Heart in CT Images", IEEE Transactions on Medical Imaging, 2008, vol. 27, No. 9, pp. 1189-1201.

"Image Classification on ImageNet", https://paperswithcode.com/sota/image-classification-on-imagenet, 115 pages.

\* cited by examiner 110
111
112
121
122
120

200

Obtain segmentation result — 210

Generate 2D image(s) — 220

Classify 2D image(s) — 230

Determine segmentation accuracy — 240

FAILURE DETECTION FOR SEGMENTATION OF AN IMAGE

CROSS-REFERENCE TO PRIOR APPLICATIONS

This application is the U.S. National Phase application under 35 U.S.C. § 371 of International Application No. PCT/EP2021/059402, filed on Apr. 12, 2021, which claims the benefit of European Patent Application No. 20169748.9, filed on Apr. 16, 2020. These applications are hereby incorporated by reference herein.

FIELD OF THE INVENTION

The present invention relates to the field of 3D image segmentation, in particular to the field of detecting an inaccurate 3D segmentation result.

BACKGROUND OF THE INVENTION

Image segmentation is a process by which an image is processed to identify boundaries between different (sub-elements) within an image. For example, where an image depicts a heart, an image segmentation process may identify the surface of different regions of the heart, e.g. the surface of the left ventricle, the surface of the right ventricle and so on.

The segmentation of 3D images, such as cardiac ultrasound, CT, or MRI volumes, is being increasingly used in clinical environments, but also has use outside of this field (e.g. in the fields of archeology, image analysis and so on). A 3D segmentation result, produced by performing a segmentation algorithm on a 3D image, can be used to generate 2D images providing target views of an object contained in the 3D image.

Some examples of segmentation algorithms employ a surface mesh model that can be adapted to boundaries (of a target object) in the image, to produce a final "segmentation mesh" as the 3D segmentation result. For example, if a 3D image represents a heart, certain mesh triangles may adapt to the left ventricle ("LV") epicardium, others to the LV endocardium, still others to the left atrial endocardium and so on.

Still other examples of segmentation algorithms produce a mask as the 3D segmentation result. A mask identifies, for each voxel of the 3D image, a predicted label for the voxel of the 3D image, e.g. whether or not a particular voxel represents part of a left ventricle myocardium or the LV bloodpool and so on. Generation of such a mask may take place using a machine-learning method to label the voxels of the 3D image.

There is a need to detect the failure of a segmentation algorithm to produce an accurate and reliable 3D segmentation result. One previous approach for failure detection, where the 3D segmentation result comprises a segmentation mesh, uses the distribution of detected boundaries in relation to the segmentation mesh. Another approach proposes to evaluate image characteristics such as contrast, noise and the like of the 3D image, possibly restricted to a region related to the segmentation, in order to estimate the suitability of the image for a successful segmentation. These approaches have been of limited success, especially for images with high contrast variability or local signal drop-out.

There is therefore an ongoing desire to improve the detection of the success or failure of a segmentation algorithm to produce an accurate and reliable 3D segmentation result, i.e. to determine the success of a 3D segmentation.

Kim, Jinman, et al. "A quantitative evaluation measure for 3D biomedical image segmentation." IFAC Proceedings Volumes 36.15 (2003): 169-173 describes an approach for evaluating a 3D image segmentation.

SUMMARY OF THE INVENTION

The invention is defined by the claims.

According to examples in accordance with an aspect of the invention, there is provided a computer-implemented method of determining a success score of a 3D segmentation result of a 3D image depicting a target object.

The computer-implemented method comprises obtaining the 3D segmentation result of the 3D image depicting the target object; generating one or more 2D images of the target object using the 3D segmentation result and the 3D image, each 2D image aiming to provide a different target view of the target object; processing each generated 2D image using an automated classification process, wherein the automated classification process generates a classification result indicating a prediction of whether, or how closely, a view of the target object provided by the 2D image matches the target view of the 2D image; and determining a success score of the 3D segmentation result by processing the classification results of all generated 2D images.

The present invention proposes to define a success score (for segmentation) based upon whether 2D images, constructed using a 3D segmentation result, have been correctly generated. In particular, one or more 2D images are generated depicting different target views. The 2D images are then classified to establish whether the intended view provided by each 2D image is correct. In particular, a mismatch between a target view (of a 2D image) and a classified view of the 2D image (i.e. the actual view provided by the 2D image) may indicate an error in the segmentation of the 3D image, i.e. an unsuccessful segmentation.

The success score of a 3D segmentation result may be a binary, discrete or continuous (e.g. numerical) measure that represents how successful the segmentation of the 3D image was. A successful segmentation of a 3D image may be achieved if the 3D segmentation result correctly maps or identifies certain features of the target object within the 3D image.

For example, the success score may indicate how accurately a 3D segmented result has segmented the 3D image, how closely a 3D segmentation result corresponds to an ideal 3D segmentation of the 3D image and/or an error level of the segmentation of the 3D image. Thus, the success score may represent, indicate or otherwise quantify how accurately predicted locations of elements of the target object in the 3D image (by the 3D segmentation result) are to the true location of those same elements.

The success score may therefore indicate an accuracy of the 3D segmentation result, and could be relabeled a "success indicator" or "accuracy indicator".

For example, the one or more 2D images may comprise a plurality of 2D images, in such instance, each 2D image aims to provide a different target view of the target object. In other words, if the step of generating one or more 2D images comprises generating two or more (i.e. a plurality of) 2D images, then each of the generated 2D images aims to provide a different target view of the target object.

Expressed differently, the step of generating one or more 2D images of the target object using the 3D segmentation result and the 3D image may comprise: generating a single 2D image of the target object using the 3D segmentation result and the 3D image, the 2D image aiming to provide a target view of the target object; or generating a plurality of 2D images of the target object using the 3D segmentation result and the 3D image, wherein each 2D image aims to provide a different target view of the target object.

The classification result may comprise one or more classification scores for a 2D image, each classification score indicating a likelihood that a view provided by a 2D image represents a predetermined view. Generating one or more classification scores provides more granular information on true view of the 2D image, enabling more accurate information on the accuracy of the 3D segmentation result to be provided.

The step of determining a success score of the 3D segmentation result may comprise processing the one or more classification scores of each 2D image, and the target view of each 2D image, to determine the success score of the 3D segmentation result. The precise mechanism for determining an accuracy of the 3D segmentation result may depend upon the format of the segmentation scores, e.g. whether a segmentation score is binary, discrete or continuous.

In some embodiments, the step of determining the success score of the 3D segmentation result comprises using a machine-learning algorithm to process the one or more classification scores of each 2D image, and the target views of each 2D image, to determine the success score of the 3D segmentation result.

Optionally, the target object is a heart. A target view provided by a generated 2D image may comprise one of (for example): a view of 2 chambers of the heart; a view of 3 chambers of the heart; a view of 4 chambers of the heart; or one of several short axis views taken at different heights between the LV apex and the mitral valve.

The 3D segmentation result may comprise a 3D mesh.

The one or more 2D images comprises at least two 2D images, and preferably at least three 2D images. This facilitates improved and/or more detailed analysis of the success of the segmentation of the 3D image.

The automated classification process may use a machine-learning method to process the 2D image to generate the classification result. The present invention is particularly advantageous when used with an automated classifier that uses a machine-learning method.

There is also proposed a computer-implemented method of generating a 3D segmentation result of a 3D image depicting a target object, the computer-implemented method comprising: processing the 3D image using a first segmentation algorithm to generate a 3D segmentation result; and determining a success score of the 3D segmentation result by performing any previously described method In some embodiments, the method further comprises, in response to the success score of the 3D segmentation result indicating that the 3D segmentation result does not meet first criteria, processing the 3D image using a second, different segmentation algorithm to generate a new segmentation result. The first criteria may depend upon the precise content of the success score. In particular examples, the first criteria may comprise a criterion that the success score indicates that the 3D segmentation result is accurate.

The second segmentation algorithm may be an adapted or modified version of the first segmentation algorithm. In particular, where a segmentation algorithm adapts or modifies an initial segmentation state (e.g. an initial surface mesh model or an initial mask), the second segmentation algorithm may use a different initial segmentation state to the first segmentation algorithm (but use the same processing methodology to adapt or modify an initial segmentation state).

Other methods for providing a different segmentation algorithm will be apparent to the skilled person, e.g. using a different one of a set of different segmentation algorithms.

In some embodiments, the method comprises, in response to the accuracy of the 3D segmentation result indicating that the 3D segmentation result does not meet the first criteria, controlling a user interface to provide a user-perceptible output indicating that the 3D segmentation result is unsuccessful or unreliable.

The first segmentation algorithm may comprise a machine-learning method configured to segment a 3D image. Similarly, any other segmentation algorithm used in the present invention may make use of a machine learning method. Examples of machine learning methods include (deep) neural networks or the like.

There is also proposed a computer program product comprising computer program code means which, when executed on a computing device having a processing system, cause the processing system to perform all of the steps of any herein described method.

There is also proposed a processing system for determining a success score of a 3D segmentation result of a 3D image depicting a target object. The processing system comprises: an obtaining module configured to obtain the 3D segmentation result of the 3D image depicting the target object; a 2D image generating module configured to generate one or more 2D images of the target object using the 3D segmentation result and the 3D image, each 2D image aiming to provide a different target view of the target object; a classifying module configured to process each generated 2D image using an automated classification process, wherein the automated classification process generates a classification result indicating a prediction of whether, or how closely, a view of the target object provided by the 2D image matches the target view of the 2D image; and a success score determining module configured to determine a success score of the 3D segmentation result by processing the classification results of all generated 2D images.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
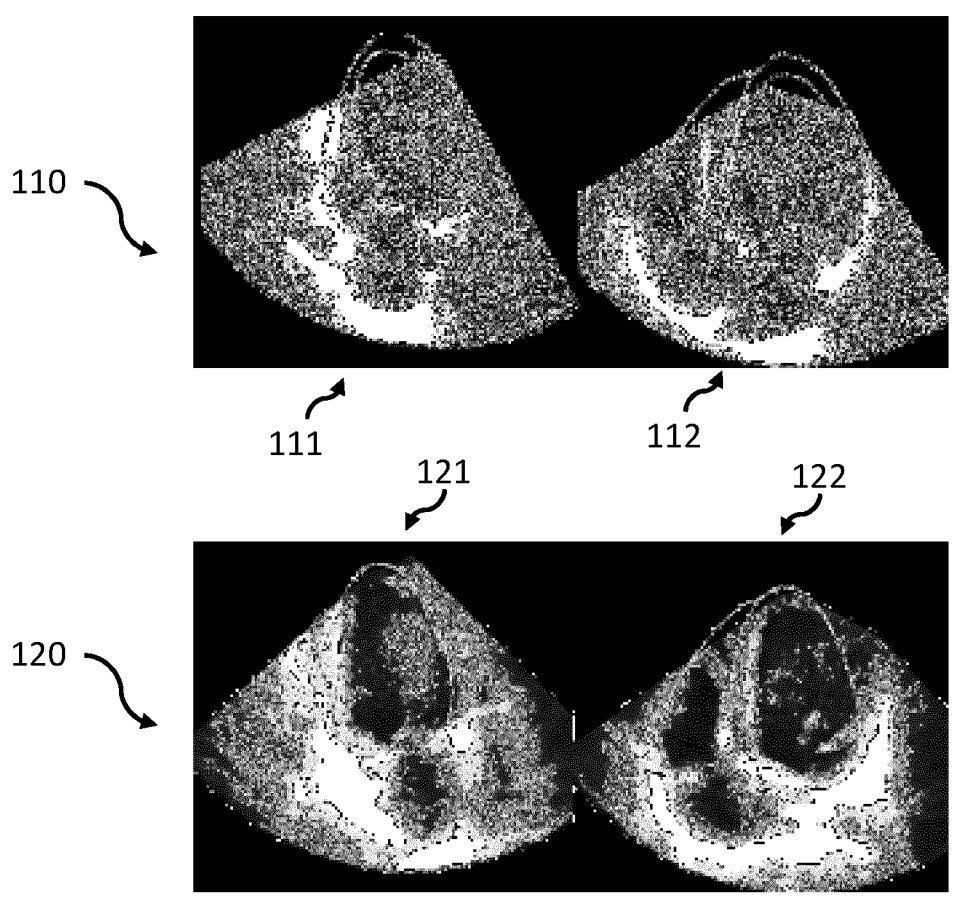
FIG. 1 illustrates 2D images generated as a result of a successful and unsuccessful segmentation.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a mechanism for determining a score indicative of a success of a segmentation of a 3D image, i.e. a success score. The mechanism proposes to obtain one or more 2D images of different target views of a target object in the 3D image, by processing a segmentation result of the 3D image. Each generated 2D image is classified using an automated classifier. The classification results are used to determine a success score, which may indicate, for example, whether, or how closely, the 3D segmentation result represents a ground truth segmentation result with sufficient accuracy (e.g. for clinical decision making).

The underlying concept of the invention is based on the realization that a failure to correctly or successfully segment a 3D image results in 2D images generated from the segmentation result providing inaccurate views (i.e. not correctly providing a desired view of a target object). The present invention proposes to exploit this recognition by generating a success score based on a determination of whether, or how closely, the one or more generated 2D images match the desired/target views. The success score could, for example, be used to control whether the 3D image needs to undergo re-segmentation, or to indicate (e.g. via a user-perceptible output) whether the segmentation result is to be trusted.

Embodiments of the invention may be employed in any circumstances where accurate segmentation of a 3D image is desirable, but finds particular use in the clinical or medical industries, e.g. for the automatic segmentation of a 3D image of an anatomical feature such as a heart.

Indeed, the mechanism herein disclosed is of particular advantage when used in the medical industry. Thus, in some embodiments, the 3D image is a 3D medical image, such as a 3D ultrasound image, a 3D MRI image or the like.

The target object of a 3D medical image may be any suitable organ, tissue, or other anatomical feature of a patient or subject, such as a heart, a liver, a kidney, the lungs, a stomach, a pancreas, a tumor, a cyst, a bladder, a (cancerous) growth, a reproductive system and so on.

In the context of the present invention, a "target view" is a desired or intended view of a target object provided by an image. Thus, images with different target views will have different virtual camera positions with respect to the target object. Determining whether or how closely a target view is matched by an image may, for instance, comprise determining whether a virtual camera position for that image matches the desired virtual camera position. Put another way, determining whether or how closely a target view is matched by an image may comprise determining whether, and/or how closely, the desired features of the target object are fully contained and correctly (e.g. according to some predetermined requirement(s)) oriented in the image.

FIG. 1 is used to illustrate an underlying recognition of the present invention, that incorrect or inaccurate segmentation of a 3D image results in the incorrect generation of a 2D image (from the 3D segmentation result) of a target/desired view (of a target object). In the illustrated examples, the target object of the 3D image is a heart, so that the 3D image is a 3D image of a heart.

The skilled person would readily appreciate how one or more 2D images, each providing a different target/desired view, can be generated from a segmentation result.

FIG. 1 illustrates a first set 110 of 2D images generated from a first segmentation result, which is generated by performing a first segmentation of a 3D image of a heart (the target object). For the first set 110 of 2D images, the first segmentation of the 3D image was successful, e.g. a segmentation result has met some predetermined accuracy criteria.

The first set 110 of 2D images provides a first 2D image 111 that aims to provide a first target view of the heart, namely a 2 chamber view, and a second 2D image 112 that aims to provide a second target view of the heart, namely a 4 chamber view.

As can be seen in FIG. 1, the first 111 and second 112 2D images of the first set 110 accurately provide suitable representations of the desired target views. In other words, the first set 110 of 2D images correctly provided the desired target views of the target object.

Figure 2:
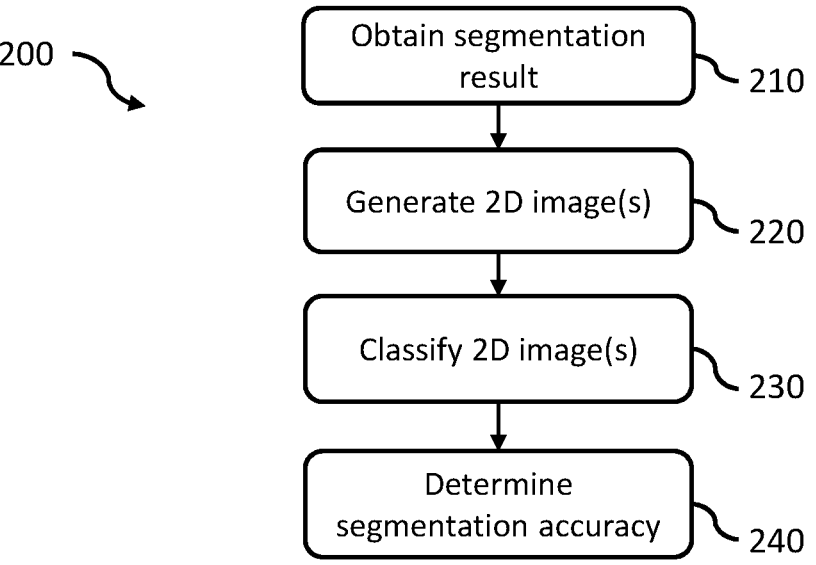
FIG. 2 illustrates a method according to an embodiment.

FIG. 2 illustrates a second set 120 of 2D images generated from a second segmentation result, which is generated by performing a second, different segmentation of a 3D image of a heart. For the second set 120 of 2D images, the second segmentation of the 3D image was unsuccessful, e.g. a segmentation result has failed to meet some predetermined accuracy criteria.

The second set 120 of 2D images provides a first 2D image 121 that aims to provide a first target view of the heart, namely a 2 chamber view, and a second 2D image 122 that aims to provide a second target view of the heart, namely a 4 chamber view. It will be apparent that the first 2D images of the first and second sets of 2D images aim to provide a same target view, and that the second 2D images of the first and second sets of 2D images also aim to provide a same target view (different to the target view of the first images).

As can be seen in FIG. 1, the first 121 and second 122 2D images of the second set 120 do not accurately provide suitable representations of the desired target views (unlike the corresponding 2D images of the first set). In particular, whilst the first 2D image 121, may still look as desired (i.e. provides a 2 chamber view), the second 2D image 122 misses an atrium and does not match the expected 4 chamber view.

Thus, it is clear that the failure of the second segmentation to successfully segment the 3D image has resulted in the inaccurate generation of a 2D image of a desired target view, i.e. the inaccurate second 2D image 122.

As previously noted, the present disclosure recognizes that generation of 2D images that correctly provide desired/target views indicates that the segmentation of the 3D image was successful and/or sufficiently accurate (e.g. to make a reliable clinical decision based on information derived therefrom). Thus, by predicting which views any generated 2D images actually represent (i.e. the "true views" provided by each 2D image), it is possible to compare the true views to the target views to predict a success of the segmentation of the 3D image.

The present invention proposes a mechanism for generating a success score that indicates a success (and/or failure) of the segmentation result.

In particular, the success score is a binary, categorical or numeric indicator of the success of the segmentation result, i.e. an indicator of how successful the segmentation algorithm has segmented the 3D image.

In some examples, the success score indicates or predicts how accurately the segmentation result represents a ground truth segmentation result of the 3D image. The success score may, for example, be indicative of the fitness of the 3D segmentation result for modelling the target object according to one or more predetermined criteria (e.g. sufficiently successful to make reliable clinical decisions therefrom).

Generally, it is an underlying recognition of the invention that the ability to accurately generate desired 2D views of a target object using the segmentation result indicates that segmentation of the 3D image of that target object was successful and/or sufficiently accurate. The present invention proposes a mechanism for generating a success score that predicts whether, or how closely, the segmentation result is to achieving this desire.

FIG. 2 illustrates a computer-implemented method 200 of determining a success score of a 3D segmentation result according to an embodiment of the invention. The 3D segmentation result may, for example, be the output of a segmentation process performed on a 3D image.

The method 200 comprises a step 210 of obtaining the 3D segmentation result. This may be obtained from any suitable provider of a 3D segmentation result, such as an image segmentation module.

The method 200 then moves to a step 220 of generating one or more 2D images using the 3D segmentation result and the 3D image. Each 2D image aims to provide a different target/desired view of the target object contained in the 3D image. The target view(s) of the 2D image(s) may be predetermined, and are preferably formed as a set of one or more predetermined target views.

In at least one example, the target object portrayed by the 3D image is the heart of a subject/patient. In some examples, a target view provided by a generated 2D image is one of: a view of 2 chambers of the heart; a view of 3 chambers of the heart; a view of 4 chambers of the heart; or a short axis view. Thus, there may be a predetermined set of target views, of which the target view of each 2D image may be a different one.

Methods of generating a 2D image of a desired target view, using a segmentation result of a 3D image and the corresponding 3D image, are well known to the skilled person.

Purely by way of example, where the 3D image is an image of a heart, a 2D image of a desired target view can use several "landmarks" such as the LV apex, a center point of some valves, or centers of gravity of some heart chambers to generate a 2D image of a particular or desired view.

The method 200 then moves to a step 230 of performing a classification process on each generated 2D image. The classification process classifies or processes the 2D image to generate information, a "classification result", that indicates a prediction of whether, or how closely, a view of the target object provided by the 2D image matches the target view of the 2D image.

The classification process may comprise generating a classification result that provides information on a predicted true view provided by each 2D image, e.g. information that indicates which of a plurality of (predetermined or known) views of a target object each 2D image is most likely to provide. By way of example, the classification process may generate one or more probabilities, each indicating a probability that a view of the target object provided by the 2D image corresponds to a different predetermined view (e.g. including at least the target view). By way of another example, the classification process may generate a single prediction indicating a most likely view of the target object provided by the 2D image (e.g. categorical data).

In another example, the classification process may comprise generating a classification result that predicts whether, or how closely, the view provided by the generated 2D image is the same as the target view of the generated 2D image. For example, the classification result may be a binary indicator that predicts whether or not the generated 2D image provides the (corresponding) target view of the 2D image or may instead be a probability that the 2D image provides the (corresponding) target view of the 2D image.

Thus, the classification result may be: a binary indicator that predicts whether, or not a view of the target object provided by the 2D image matches the target view of the 2D image; a categorical indicator that predicts a most likely view of the target object provided by the 2D image (which in turn indicates whether the view of the target object provided by the 2D image matches the target view of the 2D image); a single numerical indicator that predicts a probability that the view of the target object provided by the 2D image matches the target view of the 2D image; a plurality of numerical indicators that each predict a probability that the view of the target object provided by the 2D image matches a different predetermined view of the 2D image (e.g. where at least one of the numerical indicators predicts a probability that the view of the target object provided by the 2D image matches the target view of the 2D image).

The classification process 230 preferably processes each generated 2D image independently of any of the other generated 2D images (if present), e.g. without performing a comparison between different 2D generated images. This reduces the likelihood that any global errors in the segmentation will propogate through to the classification result(s), e.g. if all 2D images are offset from one another.

Preferably, the classification process 230 processes each generated 2D image independently, without direct reference to any other image or segmentation result. Thus, the classification process may receive, as input, only the generated 2D image (and optionally metadata for that generated 2D image) and provide, as output, the classification result for that 2D image.

The method then moves to step 240 of determining a success score of the 3D segmentation result by processing the classification results of all 2D images.

In some embodiments, the success score is a binary indicator that indicates whether or not the classification result(s) predict(s) that the views provided by all the 2D images match their respective target views. Thus, a success score of "1" may indicate that all classification results predict that the view of the target object provided by each 2D image matches its respective target views, and a success score of "0" indicates that at least one classification result predicts that the view of the target object provided by each 2D image does not match its respective target view (or vice versa).

In such embodiments, where the classification result comprises a numerical indicator indicating a probability that the view of the target object provided by the 2D image matches the target view of the 2D image, a view of the 2D image may be considered to match the target view if the indicated probability is greater than a predetermined probability, e.g. greater than 0.6, greater than 0.7 or greater than 0.9. The greater the predetermined probability, the lower the false positive rate of the success score (but the greater the false negative rate).

Other suitable predetermined probabilities will be selected by the skilled person depending upon implementation details, e.g. depending upon a maximum possible range of the numerical indicator of the classification result.

In other embodiments, the success score is a numerical measure that indicates a predicted accuracy of the 3D segmentation results, (e.g. where a maximum value is an indication that the method has determined that the 3D segmentation result is suitably accurate to be relied upon for medical decision making, and a minimum value indicates that the 3D segmentation result is unreliable).

A numerical measure may be generated, for example, based on a percentage or proportion of the classification results that predict that the view of the target object provided by the corresponding 2D image matches its respective target view. The numerical measure may, for example, be equal to the determined percentage/proportion or otherwise dependent thereon.

As another example, e.g. where each classification result provides a numerical indicator that predicts a probability (e.g. from 0 to 1) that the view of the target object provided by the 2D image matches the target view of the 2D image, the numerical measure of the success score may be the average of the numerical indicators for each 2D image. This embodiment provides a simple mechanism for estimating a numerical measure of segmentation success, as the more incorrect 2D images, the greater the likelihood that segmentation was unsuccessful.

As yet another example, e.g. where each classification result provides a numerical indicator that predicts a probability (e.g. from 0 to 1) that the view of the target object provided by the 2D image matches the target view of the 2D image, the classification result may be calculated by performing a weighted sum of the numerical indicators (e.g. where lower numerical indicators are weighted more heavily). This process could be performed using the reciprocal of the numerical indicators provided by the classification results. This embodiment increases the influence of low-accuracy 2D images on the overall success score, thereby providing an improved indication of segmentation success.

Other examples of generating a success score, which can contain binary, categorical or numeric data will be apparent to the skilled person.

Figure 3:
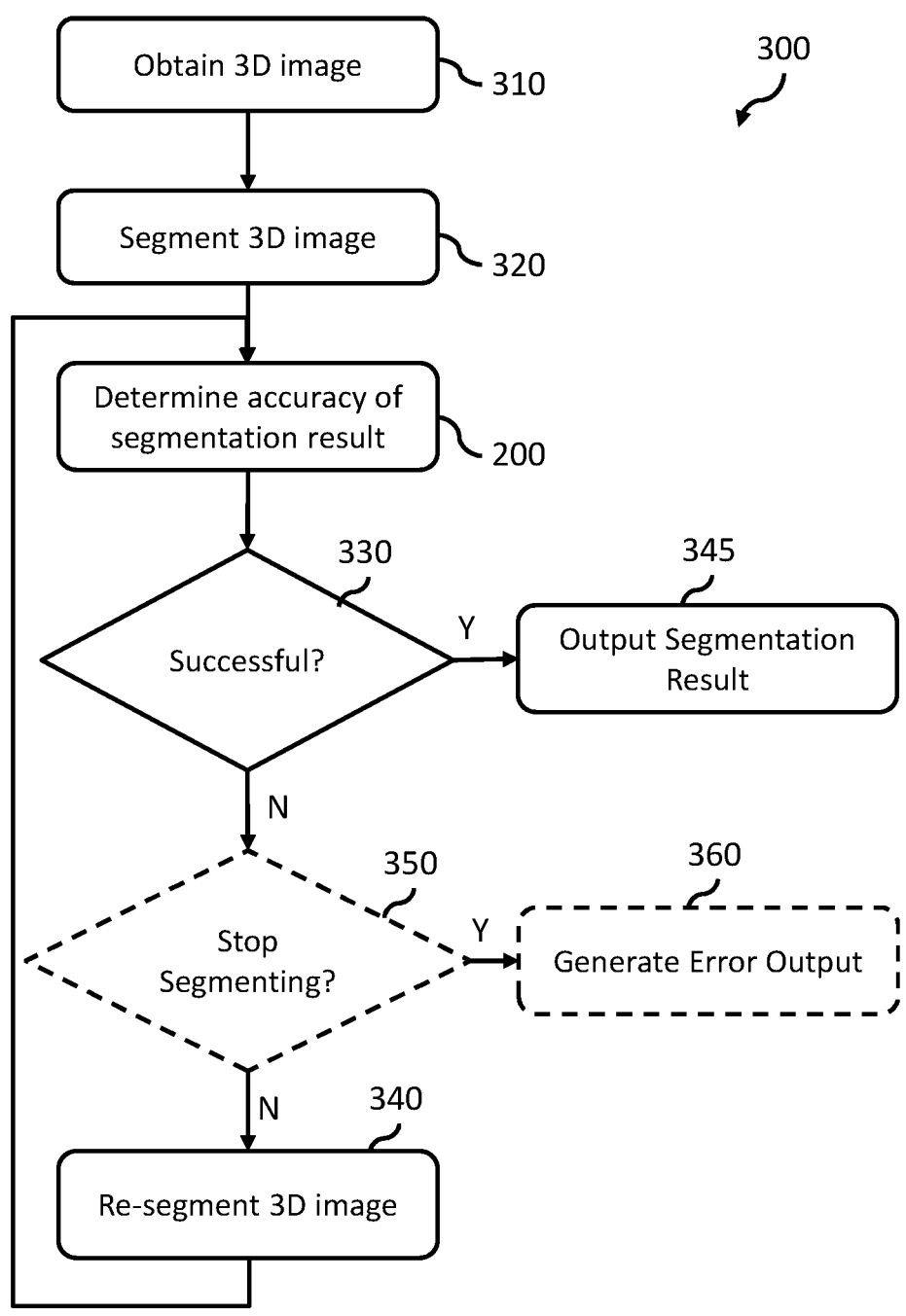
FIG. 3 illustrates a method according to an embodiment.

FIG. 3 is a flowchart illustrating a computer-implemented method 300 of generating a 3D segmentation result.

The method 300 comprises a step 310 of obtaining a 3D image of a target object. This may be obtained from any suitable provider of a 3D image, e.g. a database or directly from a 3D imaging system (such as a 3D ultrasound system or MRI system).

The method 300 further comprises a step 320 of segmenting the obtained 3D image using a first segmentation algorithm. Any suitable segmentation algorithm may be used, and would be readily available to the skilled person. In some embodiments, a segmentation algorithm uses a machine-learning method, such as a neural network, to perform segmentation of the 3D image. The segmenting of the 3D image generates a (first) segmentation result.

The method 300 further comprises a process 200 of determining a success score of the segmentation result (e.g. the segmentation result produced in step 320). The process 200 has been previously described with reference to FIG. 2.

The method 300 then moves to a decision step 330, which determines whether the segmentation was sufficiently successful based upon the success score, i.e. whether the success score meets first criteria.

The precise process performed by the decision step 330 depends upon the nature of the success score. For example, where the success score is a binary indicator, the decision step 330 can directly determine whether or not the segmentation was successful. As another example, where the success score is a numeric indicator, the decision step 330 may compare the success score to a predetermined threshold (e.g. a predetermined value) in order to determine whether or not the segmentation has been sufficiently successful.

In response to determining, in step 330, that the segmentation was successful, the method 300 may move to step 345 of outputting the segmentation result. The success score may also be output at this stage, to provide additional information on the success of the segmentation to a user (e.g. a clinician) which will provide them with an indicator of the reliability of the segmentation result, thereby directly improving their (clinical) decision making process.

In some embodiments, in response to determining (in step 330) that the segmentation was not successful, the method may move to a step 340 of re-segmenting the 3D image, using a different/adapted segmentation algorithm, to generate a different segmentation result. Thus, step 340 may therefore comprise processing the 3D image using a second, different segmentation algorithm to generate a new segmentation result.

Various embodiments for step 340 are envisaged, and can depend upon the nature of the 3D image, the segmentation algorithm(s), the segmentation result and so on.

In a first scenario, a different segmentation algorithm is used. The skilled person will appreciate that there are numerous possible segmentation algorithms that could be used to segment a 3D image, so that selection of a different segmentation algorithm could be used to perform step 330.

In a second scenario, a segmentation algorithm employs an initial segmentation state that is adapted and processed by the segmentation algorithm to produce the segmentation result (being the adapted/processed segmentation state). Suitable examples of a segmentation state include a surface mesh model or a mask.

In this scenario, step 340 may comprise modifying the initial segmentation state (used for a previous segmentation) before re-segmenting the image. In this way, the segmentation algorithm is different in that at least the initial segmentation state for the algorithm is different.

In one example, the method may receive user input from a user (e.g. indicating certain landmarks) that are used to define elements of the initial segmentation state. For example, where the target is a heart, a user may provide a user input that identifies the location of certain features of the heart within the 3D image, which are used to predetermine elements of the initial segmentation state. This example would improve the accuracy of the segmentation, by having a more accurate initial state.

As another example, the initial segmentation state may be initialized based on a successful segmentation result of another, corresponding 3D image. For example, cardiac 3D images often come in sets of at least two 3D images for segmentation (corresponding to different heart phases). A successful segmentation result of one 3D image may be used to define the initial segmentation state for another, corresponding 3D image. This example provides an automated mechanism for improving the accuracy of the segmentation result, by using an initial state that more relevantly or accurately represents the target object in the 3D image.

In a third scenario, one or more parameters, features or weights of a segmentation algorithm may be adjusted or tweaked before re-segmenting the 3D image. Thus, a segmentation algorithm can be adapted or amended before repeating a segmentation process.

In some embodiments, step 340 may comprise generating a user-perceptible output, e.g. at a user interface, to indicate that segmentation of the 3D image was unsuccessful, optionally indicating that further or re-segmentation is ongoing.

After performing step 340 (if performed), the method 300 reverts back to step 200 of determining a success score of the segmentation result, which is performed using the (re) segmented image.

This process may be iteratively repeated until step 345 is performed, i.e. until step 330 determines that a segmentation has been successful.

In some embodiments, there may be an additional check step 350, which determines whether or not to stop attempting to segment the image. This may comprise determining if more than a predetermined number of segmentation attempts has occurred, or determining if more than a predetermined period of time has elapsed whilst trying to segment the image.

In response to step 350 determining that the method 300 should stop attempting to segment the image, the method may move to a step 360 of generating an error output. Step 360 may comprise generating a user-perceptible output, e.g. at a user interface, to indicate that segmentation of the 3D image was unsuccessful.

Steps 350 and 360 can reduce processing burden if a 3D image is unable to be segmented successfully, namely by interrupting an iterative re-segmentation process, which may occur if a 3D image provides insufficient information (e.g. has too many artifacts) for accurate segmentation to occur.

Steps 350 and 360 are not essential, and can be omitted. Steps 350 and 360 can be performed, as illustrated, directly after step 330, but could be positioned elsewhere in the method (e.g. (directly) before step 200 or (directly) before step 330).

Figure 4:
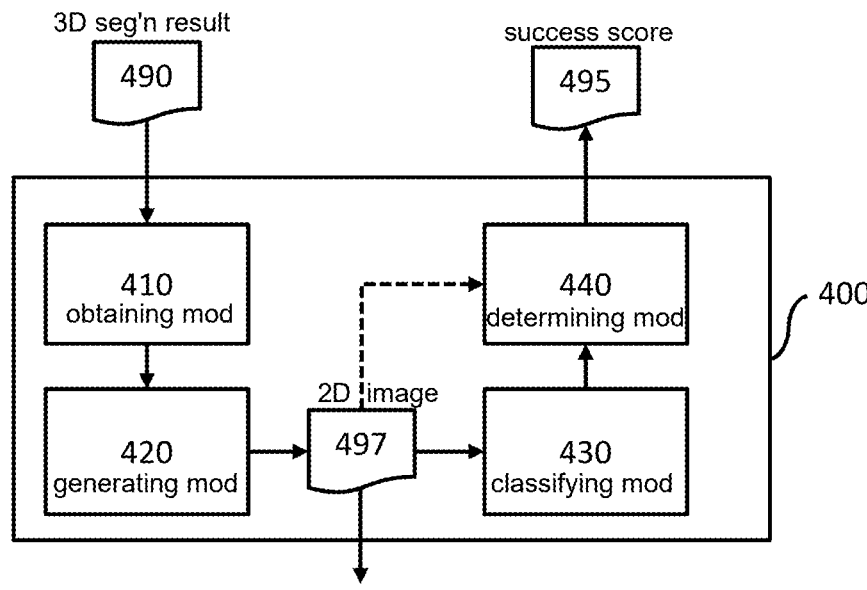
FIG. 4 illustrates a processing system according to an embodiment.

FIG. 4 illustrates a processing system 400 according to an embodiment. The processing system is adapted to determine an accuracy of a 3D segmentation result of a 3D image depicting a target object.

The processing system 400 comprises an obtaining module 410 configured to obtain the 3D segmentation result 490 of the 3D image depicting the target object. This may be obtained from any suitable database or other processing module (e.g. an image segmentation module).

The processing system 400 also comprises a 2D image generating module 420 configured to generate one or more 2D images 497 of the target object using the 3D segmentation result and the 3D image, each 2D image aiming to provide a different target view of the target object.

As illustrated, the one or more 2D images 497 may be output by the processing system, e.g. to be made available to a user interface for displaying the one or more 2D images.

The processing system 400 also comprises a classifying module 430 configured to process each generated 2D image using an automated classification process, wherein the automated classification process generates a classification result indicating a prediction of whether, or how closely, a view of the target object provided by the 2D image matches the target view of the 2D image.

The processing system 400 also comprises a success score determining module 440 configured to determine a success score 495 of the 3D segmentation result by processing the classification results of all generated 2D images. This may be performed by determining a success score of the 3D segmentation result comprises processing the one or more classification scores of each 2D image, and the target view of each 2D image 497, to determine the success score of the 3D segmentation result.

The skilled person will appreciate how the different elements of the processing system 400 can be adapted to perform any previously or herein described method.

Figure 5:
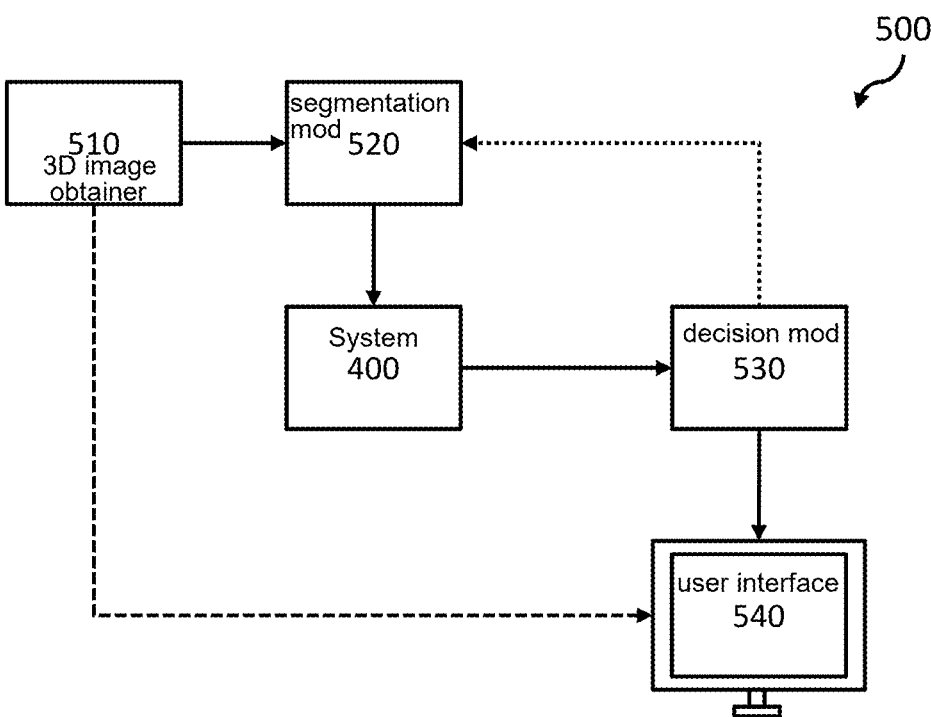
FIG. 5 illustrates a 3D image system according to an embodiment.

FIG. 5 illustrates a 3D image system 500 adapted to display information derived from a 3D image of a target object at a user interface 530.

The 3D image system 500 comprises a 3D image obtainer adapted to obtain a 3D image of a target object. Suitable examples of a 3D image obtainer include a 3D imaging module (e.g. a 3D ultrasound system or MRI system), a memory or database and/or a processor configured to extract 3D images from a memory and/or database.

The 3D image system 500 further comprises an image segmentation module 520, which is configured to segment the 3D image obtained by the 3D image obtainer 510 to produce a segmentation result. The image segmentation module 520 may, for example, use a machine-learning process to perform the segmentation, although other approaches are also contemplated and would be known to the skilled person.

The 3D image system 500 further comprises the processing system 400, described with reference to FIG. 4.

The 3D image system 500 further comprises a decision module 530 configured to determine whether to accept or reject the segmentation result, i.e. to perform the process at step 330 described at FIG. 3.

The 3D image system 500 may further comprise a user interface 540, configured to display the (approved) segmentation result and/or 2D image(s) and/or error messages and/or the success score (to improve a user's understanding of the reliability of a segmentation result or 2D images generated therefrom, and thereby improve their decision making). The 3D image system 500 may further be adapted to display the obtained 3D image (by the 3D image obtainer 510).

Embodiments of the invention may use a machine-learning method. As a first example, the classification process may use one or more machine-learning methods to classify a 2D image. As a second example, the process of generating a segmentation result may comprise using a machine-learning method to segment an image.

A machine-learning algorithm is any self-training algorithm that processes input data in order to produce or predict output data. For the first example, the input data comprises a 2D image and the output data comprises a classification result. For the second example, the input data comprises a 3D image, and the output data comprises a segmentation result.

Suitable machine-learning algorithms for being employed in the present invention will be apparent to the skilled person. Examples of suitable machine-learning algorithms include decision tree algorithms and artificial neural networks. Other machine-learning algorithms such as logistic regression, support vector machines or Naïve Bayesian models are some suitable alternatives.

The structure of an artificial neural network (or, simply, neural network) is inspired by the human brain. Neural networks are comprised of layers, each layer comprising a plurality of neurons. Each neuron comprises a mathematical operation. In particular, each neuron may—for example— calculate a weighted sum of its input data and apply some non-linear transformation on the result of the weighted sum to produce an output of the neuron. In the process of processing input data, the mathematical operation of each neuron is performed on the input data to produce a numerical output, and the outputs of each layer in the neural network are fed into the next layer sequentially. The final layer provides the output.

Methods of training a machine-learning algorithm are well known. Typically, such methods comprise obtaining a training dataset, comprising training input data entries and corresponding training output data entries ("ground-truth data"). An initialized machine-learning algorithm is applied to each input data entry to generate predicted output data entries. An error between the predicted output data entries and corresponding training output data entries is used to modify the machine-learning algorithm. This process can be repeated until the error converges, and the predicted output data entries are sufficiently similar (e.g. ±1%) to the training output data entries. This is commonly known as a supervised learning technique.

For example, where the machine-learning algorithm is formed from a neural network, (weightings of) the mathematical operation of each neuron may be modified until the error converges. Known methods of modifying a neural network include gradient descent, backpropagation algorithms and so on.

In a first example, the training input data entries correspond to example 2D images of a target object. The training output data entries correspond to ground-truth classification results. In a second example, the training input data entries correspond to example 3D images of a target object. The training output data entries correspond to ground-truth segmentation results.

The skilled person would be readily capable of developing a processing system for carrying out any herein described method. Thus, each step of the flow chart may represent a different action performed by a processing system, and may be performed by a respective module of the processing system.

Embodiments may therefore make use of a processing system. The processing system can be implemented in numerous ways, with software and/or hardware, to perform the various functions required. A processor is one example of a processing system which employs one or more microprocessors that may be programmed using software (e.g., microcode) to perform the required functions. A processing system may however be implemented with or without employing a processor, and also may be implemented as a combination of dedicated hardware to perform some functions and a processor (e.g., one or more programmed microprocessors and associated circuitry) to perform other functions.

Examples of processing system components that may be employed in various embodiments of the present disclosure include, but are not limited to, conventional microprocessors, application specific integrated circuits (ASICs), and field-programmable gate arrays (FPGAs).

In various implementations, a processor or processing system may be associated with one or more storage media such as volatile and non-volatile computer memory such as RAM, PROM, EPROM, and EEPROM. The storage media may be encoded with one or more programs that, when executed on one or more processors and/or processing systems, perform the required functions. Various storage media may be fixed within a processor or processing system or may be transportable, such that the one or more programs stored thereon can be loaded into a processor or processing system.

It will be understood that disclosed methods are preferably computer-implemented methods. As such, there is also proposed the concept of computer program comprising code means for implementing any described method when said program is run on a processing system, such as a computer. Thus, different portions, lines or blocks of code of a computer program according to an embodiment may be executed by a processing system or computer to perform any herein described method. In some alternative implementations, the functions noted in the block diagram(s) or flow chart(s) may occur out of the order noted in the figures. For example, two blocks shown in succession may, in fact, be executed substantially concurrently, or the blocks may sometimes be executed in the reverse order, depending upon the functionality involved.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A computer-implemented method of determining a success score of a 3D segmentation result of a 3D image depicting a target object comprising an anatomical feature of a patient subject, the computer-implemented method comprising:

obtaining the 3D segmentation result of the 3D image depicting the target object;

generating a plurality of 2D images of the target object using the 3D segmentation result and the 3D image, each 2D image providing a view of the anatomical feature, wherein each 2D image provides a different view of the anatomical feature;

processing each generated 2D image using an automated classification process, wherein the automated classification process generates a classification result indicating a prediction of whether, or how closely, the view of the anatomical feature provided by the 2D image matches a predetermined target view of the 2D image; and determining the success score of the 3D segmentation result by processing the classification results of all generated 2D images, wherein the match is based on a predetermined requirement of containment and orientation of the anatomical feature within the predetermined target view.

2. The computer-implemented method of claim 1, wherein the classification result comprises one or more classification scores for a 2D image, each classification score indicating a likelihood that a view provided by a 2D image matches the predetermined target view.

3. The computer-implemented method of claim 2, wherein the step of determining the success score of the 3D segmentation result comprises processing the one or more classification scores of each 2D image, and the view of each 2D image, to determine the success score of the 3D segmentation result.

4. The computer-implemented method of claim 3, wherein the step of determining the success score of the 3D segmentation result comprises using a machine-learning algorithm to process the one or more classification scores of each 2D image, and the views of each 2D image, to determine the success score of the 3D segmentation result.

5. The computer-implemented method of claim 1, wherein the target object is a heart.

6. The computer-implemented method of claim 5, wherein the view provided by a at least one of the generated 2D images is one of: a view of 2 chambers of the heart; a view of 3 chambers of the heart; a view of 4 chambers of the heart; or a short axis view.

7. The computer-implemented method of claim 1, wherein the 3D segmentation result comprises a 3D mesh.

8. The computer-implemented method of claim 1, wherein the a plurality of 2D images comprise at least three 2D images.

9. The computer-implemented method of claim 1, wherein the automated classification process uses a machine-learning method to generate the classification result.

10. A computer-implemented method of generating a 3D segmentation result of a 3D image depicting a target object comprising an anatomical feature of a patient subject, the computer-implemented method comprising:

processing the 3D image using a first segmentation algorithm to generate a 3D segmentation result; and determining a success score of the 3D segmentation result by performing the method of claim 1.

11. The computer-implemented method of claim 10, further comprising, in response to the success score of the 3D segmentation result indicating that the 3D segmentation result does not meet first criteria, processing the 3D image using a second, different segmentation algorithm to generate a new segmentation result.

12. The computer-implemented method of claim 10, further comprising:

in response to the accuracy of the 3D segmentation result indicating that the 3D segmentation result does not meet the first criteria, controlling a user interface to provide a user-perceptible output indicating that the 3D segmentation result is unsuccessful.

13. The computer-implemented method of claim 10, wherein the first segmentation algorithm comprises a machine-learning method configured to segment a 3D image.

14. A computer program product embodied in a computer-readable non-transitory computer memory and comprising computer program code means which, when executed on a computing device having a processing system, cause the processing system to perform all of the steps of the method according to claim 1.

15. A processing system for determining a success score of a 3D segmentation result of a 3D image depicting a target object comprising an anatomical feature of a patient subject, the processing system comprising:

an obtaining module configured to obtain the 3D segmentation result of the 3D image depicting the anatomical feature;

a 2D image generating module configured to generate a plurality of 2D images of the anatomical feature using the 3D segmentation result and the 3D image, each 2D image providing a view of the anatomical feature, wherein each 2D image provides a different view of the anatomical feature;

a classifying module configured to process each generated 2D image using an automated classification process, wherein the automated classification process generates a classification result indicating a prediction of whether, or how closely, the view of the anatomical feature provided by the 2D image matches a predetermined target view of the 2D image; and a success score determining module configured to determine the success score of the 3D segmentation result by processing the classification results of all generated 2D images, wherein the match is based on a predetermined requirement of containment and orientation of the anatomical feature within the predetermined target view.

* * * * *